United States Patent
Katzman et al.

(10) Patent No.: US 12,115,621 B2
(45) Date of Patent: Oct. 15, 2024

(54) LAMINATION MACHINE AND METHOD WITH AN IMPROVED BLOCKER SUPPORT

(71) Applicants: ESSILOR INTERNATIONAL, Charenton-le-Pont (FR); SHAMIR OPTICAL INDUSTRY LTD, Kibbutz Shamir (IL)

(72) Inventors: Youval Katzman, Kibbutz Shamir (IL); Zohar Katzman, Kibbutz Shamir (IL); Yohann Felten, Charenton-le-Pont (FR); Christelle Marck, Charenton-le-Pont (FR); Jeanne Marchal, Charenton-le-Pont (FR); Marc Peter, Baar (CH)

(73) Assignees: Essilor International, Charenton-le-Pont (FR); Shamir Optical Industry Ltd, Kibbutz Shamir (IL)

( * ) Notice: Subject to any disclaimer, the term of this patent is extended or adjusted under 35 U.S.C. 154(b) by 621 days.

(21) Appl. No.: 17/283,811

(22) PCT Filed: Oct. 9, 2019

(86) PCT No.: PCT/EP2019/077391
§ 371 (c)(1),
(2) Date: Apr. 8, 2021

(87) PCT Pub. No.: WO2020/074599
PCT Pub. Date: Apr. 16, 2020

(65) Prior Publication Data
US 2021/0387303 A1 Dec. 16, 2021

(30) Foreign Application Priority Data
Oct. 9, 2018 (EP) .................................. 18306329

(51) Int. Cl.
*B32B 41/00* (2006.01)
*B24B 9/14* (2006.01)
(Continued)

(52) U.S. Cl.
CPC .......... *B24B 9/146* (2013.01); *B24B 13/0037* (2013.01); *B29D 11/00009* (2013.01);
(Continued)

(58) Field of Classification Search
CPC ... B24B 9/146; B24B 13/0037; B24B 13/005; B29D 11/00009; B29D 11/0073;
(Continued)

(56) References Cited

U.S. PATENT DOCUMENTS

2007/0195262 A1  8/2007  Mosse et al.
2008/0314499 A1  12/2008  Begon et al.
(Continued)

OTHER PUBLICATIONS

International Search Report for PCT/EP2019/077391 mailed Dec. 16, 2019, 6 pages.
(Continued)

*Primary Examiner* — Michael N Orlando
*Assistant Examiner* — Joshel Rivera
(74) *Attorney, Agent, or Firm* — NIXON & VANDERHYE (57) ABSTRACT

Disclosed is a lamination machine including: a film support for receiving a functional film to be laminated; an article support configured to receive and position the optical article in a predetermined orientation; and an actuating member configured to move the film support and the article support toward each other for laminating at a predetermined pressure the functional film received in the film support onto the optical article received within the article support. The article support is a blocker support configured to receive a surfacing blocker onto which the optical article is to be disposed (Continued)

for lamination, the article support being further configured to transmit laminating forces induced by the predetermined pressure to the lamination machine during a lamination operation.

20 Claims, 2 Drawing Sheets

(51) Int. Cl.
*B24B 13/00* (2006.01)
*B29D 11/00* (2006.01)
*B32B 37/10* (2006.01)

(52) U.S. Cl.
CPC .... *B29D 11/0073* (2013.01); *B29D 11/00942* (2013.01); *B32B 37/10* (2013.01); *B32B 2551/00* (2013.01)

(58) Field of Classification Search
CPC .............. B29D 11/00942; B32B 37/10; B32B 2551/00; B29L 2011/0016; B29C 63/0073; B29C 63/16
USPC .................... 156/60, 64, 350, 351, 378, 379
See application file for complete search history.

(56) References Cited

U.S. PATENT DOCUMENTS

| | | |
|---|---|---|
| 2010/0006219 A1 | 1/2010 | Baranton et al. |
| 2011/0033615 A1 | 2/2011 | Breme et al. |
| 2013/0208239 A1 | 8/2013 | Jiang et al. |
| 2014/0329442 A1 | 11/2014 | Savoie |
| 2016/0002504 A1 | 1/2016 | Glacet et al. |
| 2016/0003986 A1 | 1/2016 | Breme et al. |

OTHER PUBLICATIONS

Written Opinion of the ISA for PCT/EP2019/077391 mailed Dec. 16, 2019, 7 pages.
Extended EP Search Report for EP18306329.6 dated Apr. 26, 2019, 12 pages.

LAMINATION MACHINE AND METHOD WITH AN IMPROVED BLOCKER SUPPORT

This application is the U.S. national phase of International Application No. PCT/EP2019/077391 filed Oct. 9, 2019 which designated the U.S. and claims priority to EP Patent Application No. 18306329.6 filed Oct. 9, 2018, the entire contents of each of which are hereby incorporated by reference.

BACKGROUND OF THE INVENTION

Field of the Invention

The invention relates to the field of the manufacture of optical articles. The invention concerns more specifically a lamination machine with an improved blocker support. The invention further concerns a method for manufacturing an optical article.

Description of the Related Art

Manufacturing optical articles, as ophthalmic lenses, generally comprise machining by surfacing a blank lens, often a semi-finished lens, so as to obtain a base lens with at least one surfaced face. This surfacing step allows to provide a predetermined optical power and/or provide selected features to the optical article. Before this surfacing step, the blank lens is disposed and blocked onto a surfacing blocker that acts as an interface support between the blank lens and a surfacing machine. The surfacing blocker enables transmission of surfacing forces from the surfacing machine and maintains the blank lens during surfacing. Surfacing is performed with the blank lens blocked onto the surfacing blocker which is coupled to the surfacing machine.

A film may be then laminated onto the surfaced face of the base lens to provide the surfaced face with added features such as a hard coat, an anti-reflective coating or a polarizing film, anti-shock properties, a tint, a mirror or a filter for specific wavelength, anti-smudge, anti-fog or antistatic properties, self-healing or self-cleaning properties, etc. After the surfacing operation, the base lens is deblocked from the surfacing blocker before being installed in the lamination machine. Afterwards, the base lens is disposed and fixed onto a lamination support that acts as an interface support between the base lens and the lamination machine. The lamination support allows to transmit lamination forces to the lamination machine and maintain the base lens during lamination. A film is then laminated onto the surfaced face of the base lens with the base lens fixed onto the lamination support. In some embodiments the lamination support may comprise lateral pincers, clamps or vacuum suction to fix the base lens.

SUMMARY OF THE INVENTION

It has been observed that the repetition of blocking and deblocking operations for surfacing and lamination steps leads the operator to perform an important number of handlings which are time-consuming and may cause defects to appear in the lens and/or may generate errors during film positioning.

A problem that the invention aims to solve is thus to provide a solution which simplifies and shortens the manufacturing of laminated surfaced surfaces of an optical article.

To solve this problem, the invention provides a lamination machine for laminating a functional film onto an optical article, said lamination machine comprising:
  a film support for receiving a functional film to be laminated,
  an article support configured to receive and position the optical article in a predetermined orientation, and
  an actuating member configured to move the film support and the article support toward each other at least along a longitudinal lamination axis for laminating at a predetermined pressure a functional film received in the film support onto an optical article received within the article support,
wherein said article support is a blocker support configured to receive a surfacing blocker onto which the optical article is to be disposed, said article support being further configured to transmit laminating forces induced by said predetermined pressure to the lamination machine during a lamination operation.

Providing a lamination machine with an article support configured to receive a surfacing blocker and to transmit lamination forces allows to use the same blocker for both surfacing and lamination steps. Hence, no specific blocker (other than the surfacing blocker) is needed for coupling the base lens to the lamination machine. The steps of blocking and deblocking the lens from the lamination support are thus unnecessary in the present manufacturing process compared to known methods.

This compatibility between the surfacing blocker and the lamination machine allows to reduce the number of handlings of the operator thereby reducing the optical article manufacturing time. The manufacturing process is therefore more efficient than known methods.

Furthermore, if defects are detected on the optical article after a lamination operation, the optical article can be reworked on the surfacing machine and then laminated again on the lamination machine without requiring supplementary deblocking and blocking steps.

According to an embodiment of the lamination machine, said at least one supporting surface is complementary shaped with regard to said at least one bearing surface.

According to an embodiment of the lamination machine, said article support comprises a plurality of supporting surfaces, at least one supporting surface being oriented:
  at least partially perpendicular to the longitudinal lamination axis to transmit forces extending along the longitudinal lamination axis, and/or
  at least partially perpendicular to a direction extending perpendicularly to the longitudinal lamination axis to transmit forces extending in a direction perpendicular to the longitudinal lamination axis.

According to an embodiment of the lamination machine, said predetermined orientation is a predetermined angular position about the longitudinal lamination axis.

According to an embodiment of the lamination machine, the optical article is an ophthalmic lens.

According to an embodiment of the lamination machine, the predetermined pressure difference applied onto the optical article through the functional film is between 0.01 MPa and 1 MPa preferably between 0.3 MPa and 0.6 MPa, preferably of about to 0.5 MPa.

The invention also provides a method for manufacturing an optical article, said method comprising:
  providing an optical article blocked onto a surfacing blocker and a functional film, said surfacing blocker having at least one bearing surface for the transmission of surfacing forces to a surfacing machine during a surfacing operation, providing a lamination machine, disposing the optical article and the surfacing blocker within a surfacing machine, surfacing the optical article coupled to the surfacing blocker, disposing the surfaced optical article and the surfacing blocker within the blocker support of the lamination machine, laminating a functional film received in the film support onto the optical article.

According to an embodiment of the manufacturing method, the surfacing and laminating steps are performed without any step of deblocking the optical article from the surfacing blocker therebetween.

According to an embodiment of the manufacturing method, the step of disposing the surfaced optical article and the surfacing blocker within the blocker support comprises a step of positioning the surfacing blocker at a predetermined angular position about the longitudinal lamination axis.

According to an embodiment of the manufacturing method, the predetermined angular position is determined depending on the orientation of the functional film.

According to an embodiment of the manufacturing method, the functional film is oriented with regard to an orientation axis which is defined depending on at least one among a polarizing direction, an anti-reflective gradient, a tint gradient and an inscription positioning.

According to an embodiment of the manufacturing method, the functional film provides to the optical article at least one feature among a hard coat, an anti-reflective coating, a polarizing film, a tint and a mirror coating.

According to an embodiment of the manufacturing method, the functional laminated film is made of Cellulose Triacetate (TAC), polyethylene terephthalate (PET), polycarbonate (PC), Polyvinyl-Alcohol (PVA), or Cyclic Olefin Copolymer (COC).

According to an embodiment of the manufacturing method, the optical article comprises a first face and a second face opposite to the first face, said method further comprising, prior to the blocking step:

coupling the second face of the optical article against a support member, laminating a first functional film onto the first face of the optical article, wherein the first face of the optical article is blocked against the surfacing blocker in the blocking step, the second surface of the optical article being surfaced in the surfacing step, the second surface of the optical article being laminated with a second functional film in the laminating step performed after the blocking step.

BRIEF DESCRIPTION OF THE DRAWINGS

The invention is described in more detail below by way of the figures that show only one preferred embodiment of the invention.

DESCRIPTION OF THE PREFERRED EMBODIMENTS

The invention is directed to a lamination machine for laminating a functional film onto an optical article.

Figure 1:
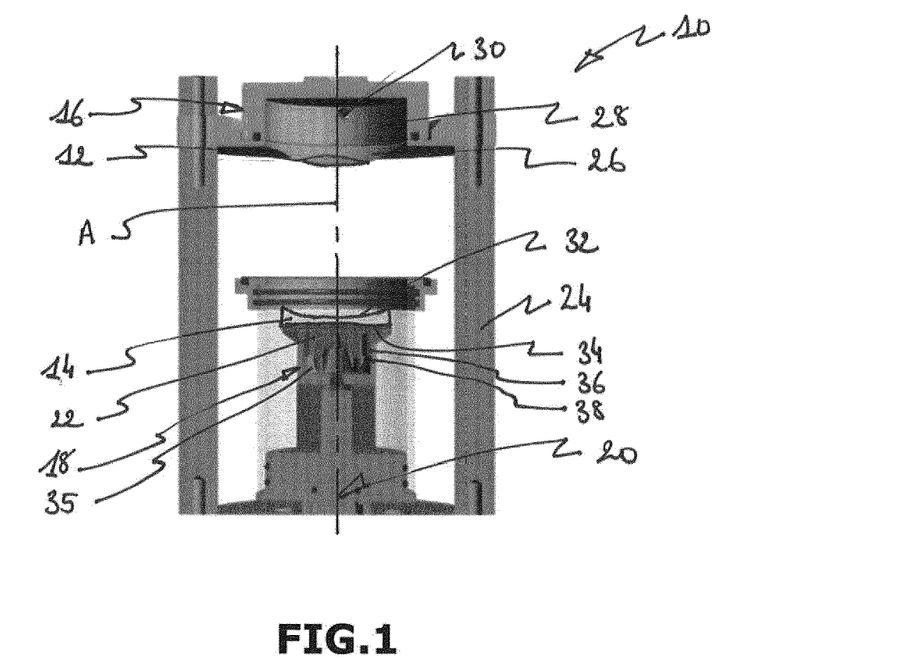
FIGS. 1 and 2 schematically show a lamination machine in a rest position and during a lamination operation, respectively.
Figure 2:
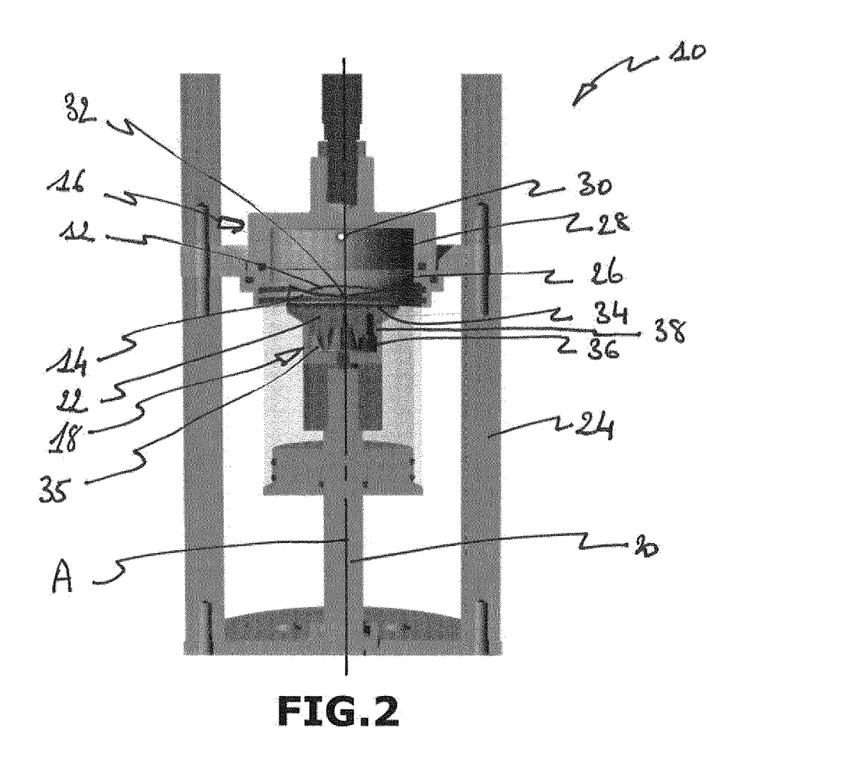

As shown on FIGS. 1 and 2, a lamination machine 10 for laminating a functional film 12 onto an optical article 14 is provided to illustrate an example of the present invention. FIG. 1 shows the lamination machine 10 in a rest position wherein the functional film 12 and the optical article 14 are set apart from each other. FIG. 2 shows the lamination machine 10 in a lamination operation wherein the functional film 12 and the optical article 14 are in contact with each other.

The optical article 14 may be an ophthalmic lens. Preferably, the optical article 14 has dimensions at least equal to the final dimensions of ophthalmic lens. We mean by "final" dimensions, the dimensions of the ophthalmic lens or optical article 14 at the end of the manufacturing process when the ophthalmic lens or the optical article 14 are ready to be worn by a user or mounted in a frame. Preferably, the dimensions of the ophthalmic lens or optical article 14 at the time of the lamination process are greater than its final dimensions. In this latter case, the final contour of the ophthalmic lens or optical article 14 is obtained with a cutting or edging step.

The optical article 14 comprises a first face 32 which is intended to be laminated and a second face 34 which is intended to be disposed against the surfacing blocker 22. The first face 32 is concave. Alternatively, the first face 32 may be of any form, e.g. convex or planar. The geometry of the first face 32 depends on the ophthalmic lens power desired for the optical article 14 when the optical article 14 is an ophthalmic lens.

By "laminating" a film, what is meant is the operation involving the deposition of a film on a surface to be laminated. This laminating operation is, in the current example, performed by first providing the film disposed onto a carrier. The film and the carrier are then compressed onto the surface to be laminated, by applying a negative difference of pressure between a side of the carrier having both the film and the optical article and the other side, or by applying a force from the optical article side. An adhesive, e.g. a pressure sensitive adhesive, is generally previously disposed on the face of the film which is intended to be pressed onto said surface so as to maintain the film on said surface. In alternative processes, the adhesive is positioned onto the optical article prior to pressing the film onto the optical article, and/or the film is pressed onto the optical article without being fixed to a carrier, but for example by directly applying pressure on the film or using a stamp or a blown membrane or balloon.

By "functional film", what is meant is a film providing to the optical article 14 at least one feature among a hard coat, providing anti-scratch properties, an anti-reflective coating, a polarizing film, a tint, a mirror or a filter for specific wavelengths, anti-shock properties, anti-smudge, anti-fog or antistatic properties, self-healing or self-cleaning properties . . . etc. When the film provides an anti-reflective coating, such coating is preferably an anti-reflective coating with a low ultraviolet reflection so as to avoid ultraviolet reflect toward the eyes. This anti-reflective coating is preferably provided on backside of the optical article 14.

The functional laminated film comprise a main film made of Cellulose Triacetate (TAC), polyethylene terephthalate (PET), polycarbonate (PC), Polyvinyl-Alcohol (PVA), or Cyclic Olefin Copolymer (COC). Alternatively, the functional film 12 may be made of a combination of these materials. Furthermore, the functional film 12 may comprise a plurality of layers.

These layers may be made of different materials. These layers may also provide the optical article 14 with different features as described above. Preferably, these layers are superposed one above the other and have the same peripheral dimensions to form a multi-layer film with a uniform perimeter.

The functional film 12 may have an elongated shape. In other words, the functional film 12 preferably comprises a first dimension greater than a second dimension perpendicular to the first dimension. Most preferably, the functional film 12 has an oblong shape. Furthermore, the functional film 12 has dimensions at least corresponding to the final dimensions of the optical article 14. Hence, the functional film 12 has dimensions allowing to cover the entire surface of the final optical article 14. However, the functional film 12 may have dimension smaller than the optical article 14 before the afore-mentioned step of edging, or base lens. Alternatively, the functional may have dimensions allowing to partly cover the surface of the final optical article 14.

The functional film 12 may comprise an orientation axis. Said orientation axis may be defined depending on at least one among a polarizing direction, an anti-reflective or reflective gradient, a tint gradient and an inscription positioning. The functional film 12 may comprise an orientation indicator. In the case where the functional film 12 is elongated, the orientation axis may extend along or perpendicular to the extension axis of the functional film 12 in a predetermined manner. This greater dimension may form a visual indicator for the orientation axis. Particularly, it is important that this orientation axis is aligned with the nasal-temporal axis of the ophthalmic lens when the ophthalmic lens gets its final shape. Otherwise, mis-alignment defects may occur leading the ophthalmic lens to have portions without any functional film 12. Furthermore, it is important to dispose the orientation axis in a predetermined orientation when the functional film 12 have a polarization axis. In the same way, it is important to dispose the orientation axis in a predetermined orientation and position with regard to a center point and the nasal-temporal axis of the ophthalmic lens, notably when the functional film 12 provides an anti-reflective or reflective linear or curved gradient, a tint linear or curved gradient, an inscription positioning or an optically active elements.

The lamination machine comprises a film support 16 for receiving the functional film 12 to be laminated and an article support 18 configured to receive and position the optical article 14 in a predetermined orientation. In the example of FIGS. 1 and 2, the functional film 12 is positioned on an external side of a carrier 26 which is intended to face and then contact the optical article 14. The carrier 26 is fastened to the film support 16, for example by means of an adhesive or by a clamping system.

The lamination machine further comprises an actuating member 20 configured to move the film support 16 and the article support 18 toward each other at least until the functional film 12 is fully contacting the surface to be laminated. This movement is performed at least along a longitudinal lamination axis A. Preferably, said longitudinal axis is orthogonal to the surface of the optical article 14 to be laminated at a central point of the optical article 14. The actuating member 20 may further be configured to move the film support 16 and the article support 18 toward each other along a plurality of lamination axes. This movement may be linear or non-linear. Said predetermined orientation provided by the article support 18 is preferably a predetermined angular position about the longitudinal lamination axis A.

In the example shown on FIGS. 1 and 2, the actuating member 20 is coupled to the article support 18 to displace the article support 18 toward the film support 16 which is fixed with regard to a frame 24. Alternatively, the actuating member 20 may be coupled to the film support 16 to displace it toward the article support 18. Alternatively, the actuating member 20 may be coupled to both the article support 18 and the film support 16. The actuating member 20 is for example a cylinder having the article support 18 or the film support 16 coupled at an end thereof.

The lamination is configured to be performed at a predetermined pressure or predetermined pressure difference applied onto the optical article 14 received within the article support 18. The predetermined pressure difference applied onto the optical article 14 through the functional film 12 is between 0.01 MPa and 1 MPa, preferably between 0.3 MPa and 0.6 MPa, preferably of about to 0.5 MPa. This predetermined pressure difference depends on the dimensions of the optical article 14, particularly the area of the surface to be laminated. To apply this predetermined pressure onto the optical article 14, the film is disposed on a carrier 26 which acts as a membrane. A positive difference of pressure may be applied between a first side of the carrier and a second side of the carrier 26 carrying the functional film 12 which is pressed against the optical article 14. The predetermined pressure difference corresponds to the pressure difference between the two sides of the carrier before application of the carrier onto the optical article 14.

In the example of FIGS. 1 and 2, the film support 16 and the carrier 26 form a cavity 28 with a second side of the carrier 26 forming a lower wall of the cavity 28. The film support 16 comprises an inlet port 30 communicating with the cavity 26 to allow a pressuring device (not shown) to regulate the pressure in the cavity 28. Before the lamination operation, a step of thermoforming the carrier 26 and the functional film 12 may be performed to provide them with a predetermined curvature. Preferably, this predetermined curvature depends on the curvature of the optical article 14.

Said article support 18 is configured to transmit laminating forces induced by said predetermined pressure to the lamination machine during a lamination operation. Hence, the article support 18 is configured to withstand said predetermined pressure difference applied onto the optical article 14. More particularly, the article support 18 is configured to support the optical article 14 in withstanding said predetermined pressure difference applied onto most or even the whole of the surface of said optical article 14.

The article support 18 is a blocker support. In other words, the article support 18 is configured to receive a blocker onto which an optical article 14 is fixed and preferably provide it with a forced predetermined orientation with regard to the lamination machine.

A "blocker" is a support piece comprising at a first side a mounting face onto which an optical article 14 is intended to be fixed and at a second side opposite to the first side a clamping portion 42 which is configured to cooperate with a blocker support. The blocker allows the optical article 14 to be well maintained during a manufacturing process, as for example surfacing, edging or lamination operations. Particularly, the blocker allows to maintain the optical article 14 in a predetermined position and orientation. The blocker is thus the interface piece between the optical article 14 and the machine, here the lamination machine.

A blocker is also known as a block, a blocking piece, a lens chuck or a surface block.

The blocker is attached or fixed to the optical article 14 by means of a blocking material which is preferably an ultraviolet and/or visible light curable adhesive blocking composition as disclosed in document EP 2 011 604 A1. Alternatively, this blocking material may be plastic materials including e-Caprolactone, Terpolymer derived from Ethyl-Methyl-Acrylate-Acrylic Acid, Polycarbonate, Polyethylene (PET), High Methacrylate Resin, Ethyl Methacrylate Resin, Methacrylate Copolymer Resin, Butyl Methacrylate Resin, and Methyl/n-Butyl Methacrylate Copolymer Resin. In some alternatives, the blocking material may be a metal alloy with a low fusion temperature.

The laminating forces applied onto the optical article 14 are thus transmitted to the blocker which also transmit these laminating forces to the article support 18 or blocker support. In other words, blocker enables to support the optical article 14 in bearing the laminating forces. Accordingly, it enables to limit the risks of the laminating forces deforming or breaking the optical article or part of the optical article.

The article support 18 is further configured to receive a surfacing blocker 22 onto which the optical article 14 is to be disposed for lamination. In other words, the article support 18 is compatible with a surfacing blocker 22. A "surfacing" blocker corresponds to a blocker that is configured to be received by a blocker support of a surfacing machine and to withstand forces involved by the surfacing operation, without any plastic deformation of the blocker. In other words, a surfacing blocker 22 is configured to transmit surfacing forces applied thereto by the optical article 14 to the blocker support and helps maintaining the optical article 14 fixed to the optical support 18 despite such forces being applied. It is reminded that the surfacing forces comprise important tangential forces. Particularly, the surfacing blocker 22 is configured to be received by a blocker support of a digital surfacing machine.

Providing an article support 18 or blocker support 18 configured to receive a surfacing blocker 22 allows to avoid supplementary deblocking and blocking steps when a surfacing operation is planned before or after the lamination operation. Indeed, in a manufacturing process comprising a step of surfacing and a step of lamination, avoiding a supplementary step of deblocking the optical article 14 from a first blocker, e.g. the surfacing blocker 22, and a supplementary step of blocking the blocker article on a second blocker, e.g. a specific blocker for lamination machine, allows to reduce the manufacturing process duration, defects that may appear in the lens and/or errors generated during film positioning.

Further the blocker support 18 of the disclosure is further such that the blocker may only be positioned in one predetermined manner. This enables that a spatial geometrical referential linked to any compatible surfacing blocker 22 is repeatably in a same orientation and position with regard to a spatial geometrical referential of the article support and thus in a controlled and known position and orientation with regard to a spatial geometrical referential of the machine. In other words, the blocker support 18 is adapted to position the surfacing blocker 22 in a predetermined orientation and position. Accordingly, this enables to reduce the apparition of mis-alignment defects and enables to suitably position the orientation axis of the functional film 12. Hence, providing the functional film 12 with the correct orientation and position allows to prevent the ophthalmic lens to have portions without any functional film 12 and further, depending on the case, to correctly position an anti-reflective or reflective gradient, a tint gradient, an inscription positioning and/or a polarization axis. Using a same blocker for surfacing and lamination steps allows the functional film 12 to be perfectly aligned within the geometrical referential used for surfacing and for providing the expected optical function.

Said surfacing blocker 22 has at least one bearing surface 38 for the transmission of surfacing forces to a surfacing machine during a surfacing operation. The article support 18 comprises at least one supporting surface 36 configured to contact said at least one bearing surface 38 when the surfacing blocker 22 is received in the blocker support to transmit laminating forces induced by said predetermined pressure. Preferably, said at least one supporting surface 36 is complementary shaped with regard to said at least one bearing surface 38. In other words, said at least one supporting surface 36 is configured to be in surface contact with the at least one bearing surface 38. A shape complementarity allows to provide a more stable and precise contact between two contacting surfaces. When the surfacing blocker 22 comprises one bearing surface 38, this bearing surface is preferably circular in shape. Preferably, the article support 18 comprises a plurality of supporting surfaces 36 configured to contact a plurality of bearing surfaces 38 of the blocker. In this latter case, the plurality of supporting surfaces 36 is complementary shaped with regard to the plurality of bearing surfaces 38. The supporting 36 and bearing 38 surfaces may be planar, circular in shape or a combination thereof. Hence, the contacting surface between the supporting 36 and bearing 38 surfaces may alternate between circular and planar or a combination thereof.

When said article support 18 comprises a plurality of supporting surfaces 36, at least one supporting surface 36 is at least partially oriented perpendicular to the longitudinal lamination axis A to transmit forces extending along the longitudinal lamination axis A. Furthermore, at least one supporting surface 36 is at least partially perpendicular to a direction extending perpendicularly to the longitudinal lamination axis A to transmit forces extending in a direction perpendicular to the longitudinal lamination axis A. In other words, a first surface portion of the article support 18 is oriented perpendicular to the longitudinal lamination axis A and a second surface portion of the article support 18 is oriented perpendicular to a direction extending perpendicularly to the longitudinal lamination axis A.

The at least one supporting surface 36 is preferably planar. Alternatively, the at least one supporting surface 36 may be curved. Furthermore, the at least one supporting surface 36 is preferably continuous. Alternatively, the at least one supporting surface 36 may be discontinuous. The at least one supporting surface 36 may also comprise protrusions and/or recesses.

As described above, the supporting surface 36 and the bearing surface 38 may be alternatively of any form or orientation allowing the transmission of the surfacing forces. It has been found that such forms and orientation allow for the transmission of the lamination forces.

In the example of FIGS. 1 and 2, the article support 18 comprises a recess 35 within which a supporting surface 36 is formed. Particularly, the supporting surface 36 is a cylindrical lateral wall of the recess 35. The supporting surface 36 cooperates with a bearing surface 38 of the surfacing blocker 22. The bearing surface 38 is here a cylindrical lateral wall of the surfacing blocker 22.

Figure 3:
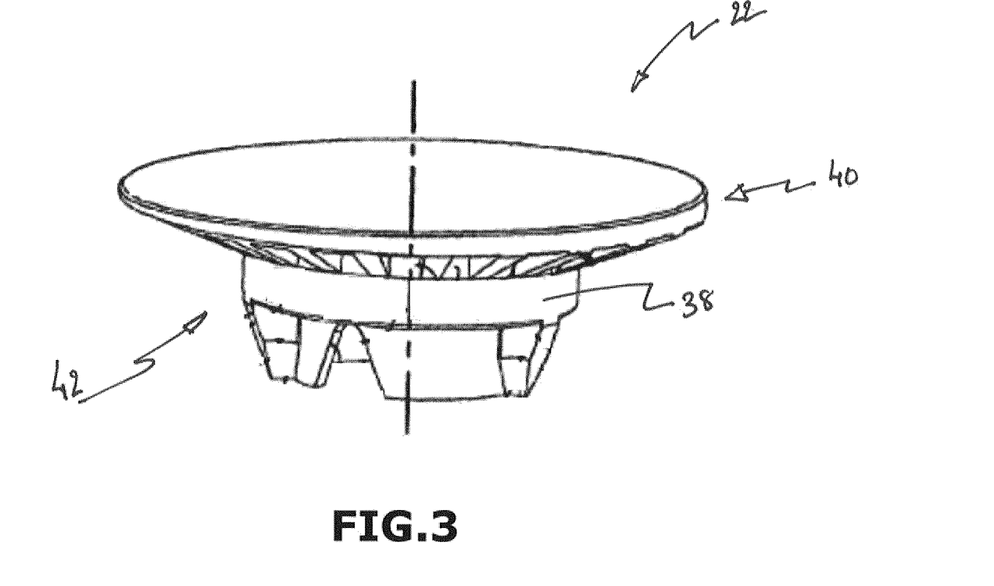
FIG. 3 schematically shows an embodiment of a surfacing blocker.
Figure 4:
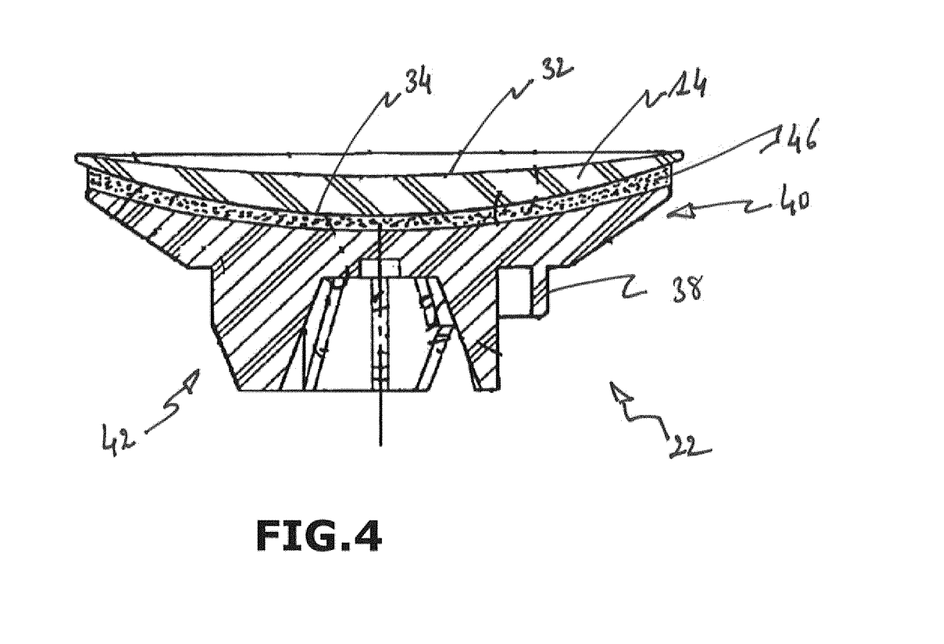
FIG. 4 schematically shows the surfacing blocker of FIG. 3 with an ophthalmic lens blocker onto a face thereof.

Furthermore, an example of a surfacing blocker 22 is shown on FIGS. 3 and 4. The surfacing blocker 22 comprises a connection portion 40 for receiving the optical article 14 and a clamping portion 42 for cooperating with the article support 18 of the lamination machine 10. The connection portion 40 comprises a connection surface 44 on which the optical article 14 is intended to be fixed by means of a blocking materiel 46. The connection surface 44 is preferably complementary shaped with regard to the second face 34 of the optical article 14. The clamping portion 42 comprises at least one bearing surface 38.

Furthermore, the machine may comprise actuating means for rotating and/or displacing the article support 18 with regard to an internal geometrical referential of the machine.

Furthermore, the machine may comprise input communicators and/or calculators designed to receive data for acquiring or determining a corrective angle or a displacement to apply to the article support 18 for a given lens to be laminated.

A method is also provided for manufacturing an optical article 14. An optical article 14 blocked onto a surfacing blocker 22 and a functional film 12 are provided. Said surfacing blocker 22 has at least one bearing surface 38 for the transmission of surfacing forces to a surfacing machine during a surfacing operation. To further reduce manufacturing time, the optical article 14 may be pre-blocked so that the optical article 14 is affixed to the surfacing blocker 22.

The optical article 14 and the surfacing blocker 22 are disposed within a surfacing machine and a surfacing step is then performed on the optical article 14 coupled to the surfacing blocker 22. This surfacing step is preferably performed in two phases: a coarse machining phase to generate an overall shape of the surfaced face of the optical article 14 and a fine machining phase to refine this surfaced face and achieve the desired surface qualities. An engraving step may also be performed after the fine machining phase. After said surfacing step, the surfaced face of the optical article 14 has a desired topography for the selected optical design. The optical article 14 may be then cleaned along with the surfacing machine. After cleaning, the optical article 14 may undergo a plasma treatment.

In an embodiment the optical article with the refined surface may be polished using a polishing machine to achieve ophthalmic desired surface quality. Said polishing step may be done while the surface article 14 is blocked on the surfacing blocker 22. However in an alternative embodiment, no polishing is done.

The surfaced optical article 14 and the surfacing blocker 22 are then disposed within the blocker support of the lamination machine and a functional film 12 received in the film support 16 is laminated onto the optical article 14.

In case no polishing is done, the surfaced optical article 14 is disposed within the lamination machine without a polishing step.

The surfacing and laminating steps are preferably performed without any step of deblocking the optical article 14 from the surfacing blocker 22 therebetween. As indicated above, this is allowed with the article support 18 which is configured to receive a surfacing blocker 22.

The step of positioning the surfacing blocker 22 at a predetermined angular position may further comprise a reorienting of the article support 18, which corresponds to a step of changing the orientation of the article support 18 according to a predetermined corrective angle. This predetermined corrective angle is an angle within a plan parallel to a plane of the film, perpendicular to the lamination axis A.

The reorienting may happen prior to receiving the surfacing blocker 22 on the article support 18 or posterior to receiving the surfacing blocker 22 on the article support 18. The reorienting displaces the orientation of the blocker support by said predetermined angle. The reorienting may be preceded by a step of inputting said corrective angle, or by a step of acquiring an angle correction value. If an angle correction value is acquired said value is used to determine the predetermined corrective angle.

Said angle correction value may be obtained by any one of:

acquiring a misalignment angle between a position of technical marking used for determining lens orientation and the geometrical referential of the surfacing blocker 22; this is similar to acquiring a misalignment angle between an axis destined to be the nasal-temporal axis for the lens once mounted in eyeglasses frames, and the geometrical referential of the surfacing blocker 22, acquiring a misalignment angle from surfacing data or determining such misalignment angle from such acquired surfacing data; this may be used when surfacing involved a decentering of the surface to manufacture by surfacing with regard to the geometrical referential of the blocker or to a geometrical center of the optical lens.

acquiring a surface cylinder angle of the surface to laminate, said surface cylinder angle representing the angle between an axis destined to be the nasal-temporal axis for the lens once mounted in eyeglasses frames, and one of the higher curvature axis or lower curvature axis when said surface is non-spherical and comprises both a higher curvature axis and a lower-curvature axis. In particular upon thermoforming, the film to laminate may also have be non strictly spherical and thus have a higher curvature axis and a lower curvature axis. In such case, the corrective angle is non-null and calculated to minimize an offset between the higher curvature of the surface of the lens and the high curvature of the film while fulfilling further general constraints.

acquiring an offset angle where the film has a film orientation axis due to having a polarization axis or a gradient axis, and the lens to manufacture needs an offset between said film orientation axis and an axis destined to be the nasal-temporal axis for the lens once mounted in eyeglasses frames.

The corrective angle may then be calculated using any of the inputs stated, alone or in combination, and while maintaining further general constraints. In particular, one constraint being that the functional film to laminate should cover the whole of the part of the lens destined to be within a predetermined eyeglasses frame after edging of the lens. This constraint is particularly relevant if the functional film doesn't have a circular contour. Accordingly, the shape of the functional film is to be taken into account during the determination of the corrective angle. Further the shape of the eyeglasses frame destined to receive the lens, and possibly the position of an optical center of the lens within said shape, may also be taken into account.

The step of positioning the surfacing blocker 22 at a predetermined angular position may further comprise a repositioning of the article support which corresponds to a step of changing the position of the article support 18 and/or its orientation according to an orientating angle comprised within a plan comprising the lamination axis.

This repositioning enables to compensate if the lens surfaces has been made using a decentering or to enable a corrective angle which would better respond to the corrective angle inputs.

The step of disposing the surfaced optical article 14 and the surfacing blocker 22 within the blocker support may comprise a step of positioning the surfacing blocker 22 at a predetermined angular position about the lamination axis A. To this end, the blocker support may comprise a positioning arrangement allowing the surfacing blocker 22 to be oriented in the predetermined angular position. This positioning arrangement may be a protrusion or a recess configured to cooperate with the surfacing blocker 22. Advantageously, the predetermined angular position is determined with regard to the orientation of the functional film 12, preferably the orientation axis of the functional film 12.

According an advantageous embodiment, said manufacturing method comprises a second lamination step on the second face 34 of the optical article 14 after the lamination of the first face 32. The functional film 12 laminated onto the first face of the optical article 14 corresponds to a first functional film 12. Particularly, after the first lamination step, said manufacturing method comprises a step of coupling the first face of the optical article 14 against a support member. In other words, the laminated face of the optical article 14 is blocked onto another support. This support may be a surfacing blocker 22. The second face of the optical article 14 is deblocked from the first surfacing blocker 22 either before, after or during the blocking of the second face.

Then, a second functional film 12 is laminated onto the second face of the optical article 14. Preferably, a step of surfacing the second face 34 is performed before the second lamination step.

According to this manufacturing method, only two blocking steps may be made to perform four distinct manufacturing steps on two different faces of the optical article 14, i.e. two surfacing steps and two lamination steps. This allows to reduce the manufacturing time of the optical article 14 with regard to a method using lamination which is not compatible with a surfacing blocker 22. Defects that may appear in the lens and/or errors generated during film positioning are also reduced. As mentioned above, using a same blocker for surfacing and lamination steps allows the functional film 12 to be perfectly aligned within the geometrical referential used for surfacing and lamination steps as well as providing the expected optical function. Misalignment defects of the functional film 12 with regard to the ophthalmic lens is thus avoided between the two steps.

The optical article 14 may be then deblocked from the support member or surfacing blocker 22. The optical article 14 may be also inspected 190 for detecting potential defects and resized in an edging step which involves cutting the optical article 14 into an appropriate shape to fit a lens frame.

Alternatively, the edging and detecting steps may be performed before the deblocking step, i.e. with the optical article 14 blocked on the surfacing blocker 22 or support member. Therefore, if defects are detected on the optical article 14, the optical article 14 can be reworked and then laminated again without requiring supplementary deblocking and blocking steps. The optical article 14 may be reworked by removing the uppermost layer of about 0.2 mm. By "reworked", what is meant is a surfacing step with possible supplementary engraving and polishing steps.

The invention claimed is:

1. Lamination machine (10) for laminating a functional film (12) onto an optical article (14), said lamination machine comprising:
   a film support (16) for receiving a functional film (12) to be laminated,
   an article support (18) configured to receive and position the optical article (14) in a predetermined orientation, and
   an actuating member (20) configured to move the film support (16) and the article support (18) toward each other at least along a longitudinal lamination axis (A) for laminating at a predetermined pressure the functional film (12) received in the film support (16) onto the optical article (14) received within the article support (18),
   wherein said article support (18) is a blocker support configured to receive a surfacing blocker (22) onto which the optical article (14) is to be disposed for lamination, said article support (18) being further configured to transmit laminating forces induced by said predetermined pressure to the lamination machine (10) during a lamination operation.

2. The lamination machine (10) according to claim 1, said surfacing blocker (22) having at least one bearing surface (38) for the transmission of surfacing forces to a surfacing machine during a surfacing operation, wherein said article support (18) comprises at least one supporting surface (36) configured to contact said at least one bearing surface (38) when a surfacing blocker (22) is received in the blocker support to transmit laminating forces induced by said predetermined pressure.

3. The lamination machine (10) according to claim 2, wherein said at least one supporting surface (36) is complementary shaped with regard to said at least one bearing surface (38).

4. The lamination machine (10) according to claim 2, wherein said article support comprises a plurality of supporting surfaces (36), at least one supporting surface (36) being oriented:
   at least partially perpendicular to the longitudinal lamination axis (A) to transmit forces extending along the longitudinal lamination axis (A), and/or
   at least partially perpendicular to a direction extending perpendicularly to the longitudinal lamination axis (A) to transmit forces extending in a direction perpendicular to the longitudinal lamination axis (A).

5. The lamination machine (10) according to claim 1, wherein said predetermined orientation is a predetermined angular position about the longitudinal lamination axis (A).

6. The lamination machine (10) according to claim 1, wherein the optical article (14) is an ophthalmic lens.

7. The lamination machine (10) according to claim 1, wherein the predetermined pressure difference applied onto the optical article (14) through the functional film (12) is between 0.01 MPa and 1 MPa.

8. Method for manufacturing an optical article (14), said method comprising:
   providing an optical article (14) blocked onto a surfacing blocker (22) and a functional film (12), said surfacing blocker (22) having at least one bearing surface (38) for the transmission of surfacing forces to a surfacing machine during a surfacing operation,
   providing a lamination machine (10) according to claim 1,
   disposing the optical article (14) and the surfacing blocker (22) within a surfacing machine,
   surfacing the optical article (14) coupled to the surfacing blocker (22),
   disposing the surfaced optical article (14) and the surfacing blocker (22) within the blocker support of the lamination machine (10),
   laminating the functional film (12) received in the film support (16) onto the optical article (14).

9. The method according to claim 8, wherein the surfacing and laminating steps are performed without any step of deblocking the optical article (14) from the surfacing blocker (22) therebetween.

10. The method according to claim 8, wherein said predetermined orientation is a predetermined angular position about the longitudinal lamination axis (A), and wherein the step of disposing the surfaced optical article (14) and the surfacing blocker (22) within the blocker support comprises a step of positioning the surfacing blocker (22) at a predetermined angular position about the longitudinal lamination axis (A).

11. The method according to claim 10, wherein the predetermined angular position is determined depending on the orientation of the functional film (12).

12. The method according to claim 8, wherein the functional film (12) is oriented with regard to an orientation axis which is defined depending on at least one among a polarizing direction, an anti-reflective gradient, a tint gradient and an inscription positioning.

13. The method according to claim 8, wherein the functional film (12) provides to the optical article (14) at least one feature among a hard coat, an anti-reflective coating, a polarizing film, a tint and a mirror coating.

14. The method according to claim 8, wherein the functional laminated film (12) is made of Cellulose Triacetate (TAC), polyethylene terephthalate (PET), polycarbonate (PC), Polyvinyl-Alcohol (PVA), or Cyclic Olefin Copolymer (COC).

15. The method according to claim 8, wherein the optical article (14) comprises a first face (32) and a second face (34) opposite to the first face (32), said method further comprising, prior to the blocking step:
coupling the second face (34) of the optical article (14) against a support member,
laminating a first functional film (12) onto the first face (32) of the optical article (14),
wherein the first face (32) of the optical article (14) is blocked against the surfacing blocker (22) in the blocking step, the second face (34) of the optical article (14) being surfaced in the surfacing step, the second face (34) of the optical article (14) being laminated with a second functional film (12) in the laminating step performed after the blocking step.

16. The lamination machine (10) according to claim 3, wherein said article support comprises a plurality of supporting surfaces (36), at least one supporting surface (36) being oriented:
at least partially perpendicular to the longitudinal lamination axis (A) to transmit forces extending along the longitudinal lamination axis (A), and/or
at least partially perpendicular to a direction extending perpendicularly to the longitudinal lamination axis (A) to transmit forces extending in a direction perpendicular to the longitudinal lamination axis (A).

17. The lamination machine (10) according to claim 2, wherein said predetermined orientation is a predetermined angular position about the longitudinal lamination axis (A).

18. The lamination machine (10) according to claim 3, wherein said predetermined orientation is a predetermined angular position about the longitudinal lamination axis (A).

19. The lamination machine (10) according to claim 1, wherein the predetermined pressure difference applied onto the optical article (14) through the functional film (12) is between 0.3 MPa and 0.6 MPa.

20. The lamination machine (10) according to claim 1, wherein the predetermined pressure difference applied onto the optical article (14) through the functional film (12) is about 0.5 MPa.

* * * * *